United States Patent [19]
Miyazaki et al.

[11] Patent Number: 6,038,009
[45] Date of Patent: *Mar. 14, 2000

[54] FERROELECTRIC LIQUID CRYSTAL DISPLAY DEVICE

[75] Inventors: Aya Miyazaki; Mitsuhiro Koden, both of Kashiwa, Japan; Paul Antony Gass, Oxford, United Kingdom

[73] Assignee: Sharp Kabushiki Kaisha, Osaka, Japan

[*] Notice: This patent is subject to a terminal disclaimer.

[21] Appl. No.: 09/292,233

[22] Filed: Apr. 15, 1999

Related U.S. Application Data

[62] Division of application No. 08/670,267, Jun. 21, 1996, Pat. No. 5,923,394.

[51] Int. Cl.$^7$ .............................. G02F 1/1333; G02F 1/13
[52] U.S. Cl. ...................... 349/188; 349/172; 349/178; 349/161; 349/184
[58] Field of Search .................................. 349/172, 178, 349/110, 188, 161, 183, 184

[56] References Cited

U.S. PATENT DOCUMENTS

| | | | |
|---|---|---|---|
| 5,214,523 | 5/1993 | Nito et al. | 359/100 |
| 5,404,237 | 4/1995 | Katsuse et al. | 359/56 |
| 5,434,685 | 7/1995 | Pirs et al. | 359/51 |
| 5,437,814 | 8/1995 | Koden et al. | 252/299.61 |
| 5,504,600 | 4/1996 | Pirs et al. | 359/51 |
| 5,609,790 | 3/1997 | Tanaka et al. | 252/299.61 |
| 5,612,450 | 3/1997 | Mizushima et al. | 528/353 |
| 5,644,371 | 7/1997 | Koden et al. | 349/110 |

FOREIGN PATENT DOCUMENTS

| | | |
|---|---|---|
| 0 586 014 A1 | 3/1994 | European Pat. Off. . |
| WO 96/07123 | 3/1996 | WIPO . |

OTHER PUBLICATIONS

M. Koden, et al., "Ferroelectric Liquid Crystal Device Using the tau–V/sub MIN Mode", Ferroelectrics, 1993, vol. 149, pp. 183–192.

J. Pirs, et al., "Ferroelectric Liquid Crystal–Polymer Gel Displays", Informacije Midem, 1993, Slovenia, vol. 23, No. 1, pp. 38–42.

Noel A. Clark, et al., Applied Physics Letter, vol. 36, No. 11, pp. 899–901 (1980).

N. Wakita, et al., Fourth International Conference Ferroelectric Liquid Crystals (P–145), pp. 367–368 (1993).

H. Molsen, et al., The 13th International Display Research Conference, PDLC–3, pp. 113–116 (1993).

Garry Lester, et al., Ferroelectrics, vol. 148, pp. 389–399 (1993).

H. Fujikake et al., The 41st Applied Physics Related Association Lecture Meeting, 29p–p–15, preprints No. 3, 1120, (1994) Partial Translation.

*Primary Examiner*—William L. Sikes
*Assistant Examiner*—Julie Ngo
*Attorney, Agent, or Firm*—David G. Conlin; George W. Neuner; Dike, Bronstein, Roberts & Cushman, LLP

[57] ABSTRACT

A ferroelectric liquid crystal display device is described. The device has a pair of substrates having at least an electrode film and an alignment film, and a complex made of a ferroelectric liquid crystal material and a polymer material disposed between the substrates. The complex has a network structure such that the network structure stabilizes the orientation of molecules of the ferroelectric liquid crystal material. Directions of pretilt angles of the molecules of the ferroelectric liquid crystal material located at interfaces between the substrates and the ferroelectric liquid crystal material are substantially identical. The ferroelectric liquid crystal material has a chevron layer structure, and a bending direction of the chevron layer structure is substantially identical to the directions of the pretilt angles of the molecules at the interfaces.

6 Claims, 4 Drawing Sheets

FERROELECTRIC LIQUID CRYSTAL DISPLAY DEVICE

CROSS-REFERENCE TO RELATED APPLICATIONS

This application is a division of Ser. No. 08/670,267 filed Jun. 21, 1996, now U.S. Pat. No. 5,923,394.

BACKGROUND OF THE INVENTION

1. Field of the Invention

The present invention relates to a display device using ferroelectric liquid crystal. More specifically, the present invention relates to a display device using a complex made of ferroelectric liquid crystal and a polymer material.

2. Description of the Related Art

Figure 5:
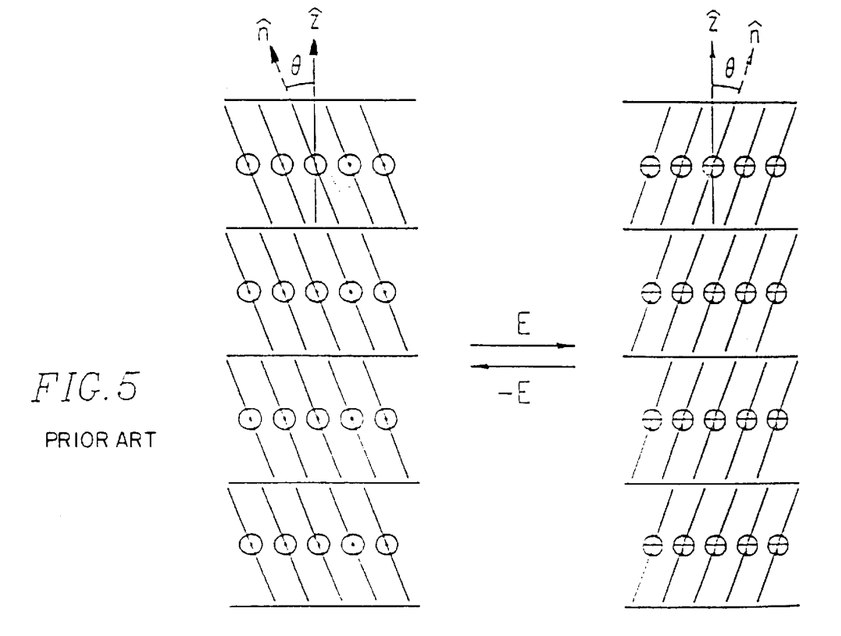
FIG. 5 is a switching view schematically showing an operation principle of ferroelectric liquid crystal. Symbol ⊙ and ⊕ represent the direction of spontaneous polarization, $\hat{z}$ represents a normal to a layered structure, $\hat{n}$ represents a long axis direction of liquid crystal molecules, and θ represents a tilt angle.

In general, ferroelectric liquid crystal display devices utilize a liquid crystal phase such as a chiral smectic C phase. In the chiral smectic C phase, liquid crystal molecules form a layered structure so as to be aligned at an angle against a normal of the layered structure. In a bulk state, the liquid crystal molecules are arranged having a spiral structure; however, in a liquid crystal cell with a thickness smaller than a spiral pitch of the molecules, they are undone and bistably arranged as shown in FIG. 5. The ferroelectric liquid crystal has spontaneous polarization (Ps) in the direction perpendicular to the normal. Therefore, upon being applied with a voltage, they are rearranged in such a manner that their spontaneous polarization is directed along the applied electric field. When a pair of polarizing plates (i.e., a polarizer and an analyzer) are attached to such a ferroelectric liquid crystal display panel, displays in a transparent state or in an opaque state can be obtained (N. A. Clark and S. T. Lagerwall, Appl. Phys. Lett., 36, 899 (1980)).

The ferroelectric liquid crystal molecules are rearranged as described above by the interaction between the applied electric field and the spontaneous polarization of the molecules, which enables a fast response of the liquid crystal molecules on the order of microseconds. The ferroelectric liquid crystal molecules have the property of keeping a state under the application of a voltage even after power-down. This is a so-called memory property. A display per scanning line is performed at a high speed by utilizing the characteristics of the ferroelectric liquid crystal, such as a fast response and a memory property. Thus, simple matrix display devices with a large capacity can be produced.

Figure 6:
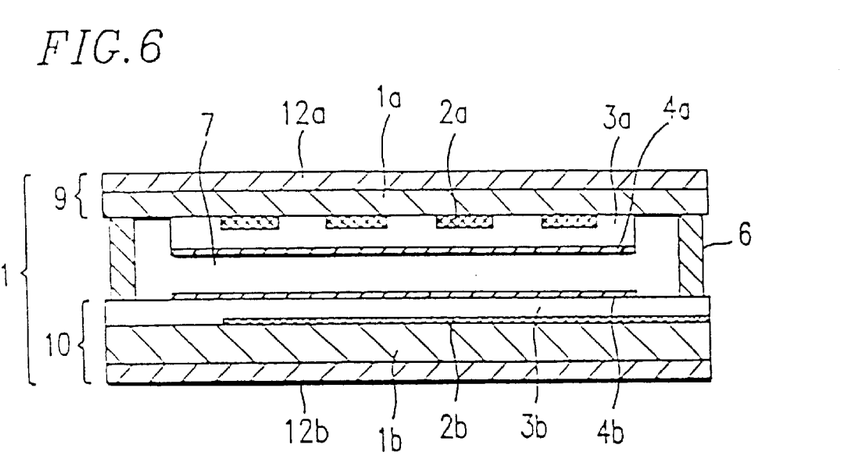
FIG. 6 is a cross-sectional view of a ferroelectric liquid crystal display device.

FIG. 6 shows a basic configuration of a ferroelectric liquid crystal display device 11. The display device 11 has substrates 9 and 10 attached to each other via a sealant 6 with a liquid crystal material 7 interposed therebetween so as to have a cell thickness of about 1.5 $\mu$m. The substrate 9 has an electrode film 2a made of indium tin oxide (ITO), an insulating film 3a, an alignment film 4a, and a polarizing plate 12a. The substrate 10 has an electrode film 2b made of ITO, an insulating film 3b, an alignment film 4b, and a polarizing plate 12b. The alignment films 4a and 4b are made of a polymer film such as polyimide and their surfaces are subjected to rubbing. The electrode films 2a and 2b are connected to driving circuits.

The display device 11 has the same configuration as that of conventional simple matrix liquid crystal display devices, except that the cell thickness is as thin as 1.5 $\mu$m, and ferroelectric liquid crystal is used.

The ferroelectric liquid crystal display devices are weak with respect to shocks, a pressure, etc., so that they have a critical problem of instability (N. Wakita et al., Abstr. 4th International Conference on Ferroelectric Liquid Crystals, 367 (1993)). In general, liquid crystal molecules in a liquid crystal cell are likely to flow upon the application of shocks, a pressure, etc. The flow of the liquid crystal molecules disturbs the initial arrangement of the liquid crystal molecules. The weakness of the ferroelectric liquid crystal display devices with respect to shocks, a pressure, etc. is attributable to the fact that once disturbed liquid crystal molecules do not voluntarily return to their original arrangement. Thus, in order to enhance shock stability of the ferroelectric liquid crystal display devices, it is required to prevent the liquid crystal molecules from flowing in the liquid crystal cell upon the application of shocks, a pressure, etc.

The following methods have been proposed for preventing the liquid crystal molecules from flowing upon the application of shocks, a pressure, etc.

One method uses a polymer dispersed ferroelectric liquid crystal material (H. Molsen, R. Bardon, H. S. Kitzerow, The 13th international display research conference, Proc of Euro Display '93, Strasburg, 1993, p. 113). However, display devices which satisfy requirements for practical use thereof, such as a response speed, a contrast, and an available working temperature range have not been produced using this method.

Another method has been proposed in which polymer liquid crystal is added to ferroelectric liquid crystal (G. Lester, H. Coles, A. Murayama, Ferroelectrics, 148, 389 (1993)). This method also has a drawback in that the added polymer liquid crystal decreases the orientation property of ferroelectric liquid crystal molecules and makes a response speed thereof lower.

Recently, a method has been proposed, in which a mixture of ferroelectric liquid crystal and a light-curable prepolymer is irradiated with UV-rays, thereby phase-separating the mixture into ferroelectric liquid crystal and a polymer formed by photopolymerization (Fujikake et al., Preprints No. 3, 1120 (1994) of The 41st Applied Physics related association lecture meeting). According to this method, the minuteness of the formed polymer does not allow light to be scattered. This literature neither discloses nor suggests the enhancement of shock stability. In addition, according to this method, the mixture of ferroelectric liquid crystal and the light-curable prepolymer is heated so as to exhibit a nematic phase (i.e., heated to 75° C.) and is phase-separated into a polymer and ferroelectric liquid crystal while the liquid crystal molecules are aligned with a polyimide film. In this manner, the liquid crystal molecules are fixed by the polymer without exhibiting a smectic C phase which they are supposed to exhibit. As a result, there arises a problem that the liquid crystal molecules are not sufficiently oriented.

SUMMARY OF THE INVENTION

In order to solve the above-mentioned problems, the inventors of the present invention have earnestly studied a method for improving shock stability of a liquid crystal display device while retaining an orientation state of ferroelectric liquid crystal. As a result, they found the following: By forming a particular orientation state of ferroelectric liquid crystal in a mixture of a liquid crystal material and a photopolymerizable monomer material, followed by photopolymerizing the monomer material, or by forming an isotropic mixture of the liquid crystal material and the photopolymerizable monomer material, followed by cooling the mixture down to a temperature at which the liquid crystal material becomes a particular orientation state, ferroelectric liquid crystal molecules can be prevented from flowing while retaining the orientation state and the shock stability of the resultant liquid crystal display device can be enhanced. Furthermore, they also found that where a ferroelectric liquid crystal material has a particular structure and ferroelectric liquid crystal molecules having a negative dielectric anisotropy have a particular orientation state, ferroelectric liquid crystal display devices having outstanding properties such as a high write speed, a high contrast, and a wide working temperature range can be obtained.

According to one aspect of the present invention, the ferroelectric liquid crystal display device includes substrates having at least an electrode film and an alignment film, and a complex made of a ferroelectric liquid crystal material and a polymer material between substrates attached to each other, wherein directions of pretilt angles of molecules of ferroelectric liquid crystal material located at interfaces between the substrates and the ferroelectric liquid crystal material are identical, the ferroelectric liquid crystal material has a chevron layer structure, and a bending direction of the chevron layer structure is identical with the directions of the pretilt angles of the ferroelectric liquid crystal molecules at the interfaces.

In another embodiment of the invention, the alignment film is an organic polymer film and is provided with a pretilt angle by rubbing.

In another embodiment of the invention, the ferroelectric liquid crystal material exhibits negative dielectric anisotropy and exhibits a local minimum value in a voltage-memory pulse width curve.

In one embodiment of the invention, a content of the polymer material is 10% by weight or less of the total weight of the complex.

According to another aspect of the present invention, a method for producing a ferroelectric liquid crystal display device includes the steps of: attaching substrates to each other, each having at least an electrode film and an alignment film; providing a mixture of a ferroelectric liquid crystal material and a photopolymerizable monomer material between the substrates; heating the mixture to a temperature at which the mixture becomes isotropic liquid, followed by cooling the mixture to a temperature at which the ferroelectric liquid crystal material in the mixture exhibits a chiral smectic C phase; and photopolymerizing the photopolymerizable monomer material in the mixture in a temperature range in which the ferroelectric liquid crystal material in the mixture exhibits a chiral smectic C phase so as to form a polymer.

In one embodiment of the invention, directions of pretilt angles of ferroelectric liquid crystal molecules at interfaces between the substrates and the ferroelectric liquid crystal material are identical, the ferroelectric liquid crystal material has a chevron layer structure, and a bending direction of the chevron layer structure is identical with the directions of pretilt angles of the ferroelectric liquid crystal molecules at the interfaces at the temperature at which the ferroelectric liquid crystal material in the mixture exhibits a chiral smectic C phase.

In another embodiment of the invention, the alignment film is an organic polymer film and is provided with a pretilt angle by rubbing.

In a further embodiment of the invention, the ferroelectric liquid crystal material exhibits negative dielectric anisotropy and exhibits a local minimum value in a voltage-memory pulse width curve.

In still a further embodiment of the invention, a content of the polymer material is 10% by weight or less of the total weight of the complex.

According to still another aspect of the present invention, a method for producing a ferroelectric liquid crystal display device includes the steps of: attaching substrates to each other, each substrate having at least an electrode film and an alignment film; providing a mixture of a ferroelectric liquid crystal material and a photopolymerizable monomer material between the substrates; heating the mixture to a temperature at which the mixture becomes isotropic liquid, followed by photopolymerizing the photopolymerizable monomer material in the mixture at the temperature so as to form a polymer; and cooling a complex of the ferroelectric liquid crystal material and the formed polymer to a temperature at which the ferroelectric liquid crystal material in the complex exhibits a chiral smectic C phase.

In one embodiment of the invention, the alignment film is an organic polymer film and is provided with a pretilt angle by rubbing.

In another embodiment of the invention, the ferroelectric liquid crystal material exhibits negative dielectric anisotropy and exhibits a local minimum value in a voltage-memory pulse width curve.

In a further embodiment of the invention, a content of the polymer material is 10% by weight or less of the total weight of the complex.

Since the ferroelectric liquid crystal display device of the present invention utilizes a complex containing a ferroelectric liquid crystal material having C2U orientation and a polymer material having a network structure, the display device is capable of writing data at a high speed with a high contrast and of operating in a wide range of temperatures.

Furthermore, according to the present invention, a particular alignment state is established in ferroelectric liquid crystal in the mixture of the ferroelectric liquid crystal material and the photopolymerizable monomer material, and then the monomer material is photopolymerized. As a result, the ferroelectric liquid crystal can be put in a satisfactory orientation state.

Thus, the invention described herein makes possible the advantage of providing a ferroelectric liquid crystal display device having a satisfactory orientation property of liquid crystal molecules, a satisfactory display characteristic, and shock stability.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrative examples with reference to the drawings.

Definition

The term "complex" as used herein refers to a material which includes a ferroelectric liquid crystal material and a polymer formed by photo-polymerization. The polymer can be a linear polymer, a crosslinked polymer or a mixture thereof. In addition, the complex may contain an unreacted photopolymerizable monomer which is a starting material for the polymer.

The complex has a network structure, whereby the orientation of the ferroelectric liquid crystal molecules is stabilized. In the case of a linear polymer, the linear polymer chains form a physical network structure by entanglements. On the other hand, in the case of the crosslinked polymer, the network structure is formed by chemical bonds.

Preferred Orientation State of Liquid Crystal Molecules

Figure 7A:
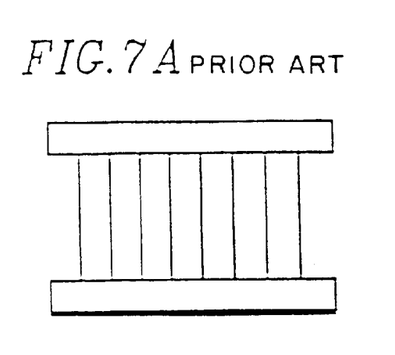
FIGS. 7A and 7B show a bookshelf structure and a chevron structure of ferroelectric liquid crystal, respectively.
Figure 7B:
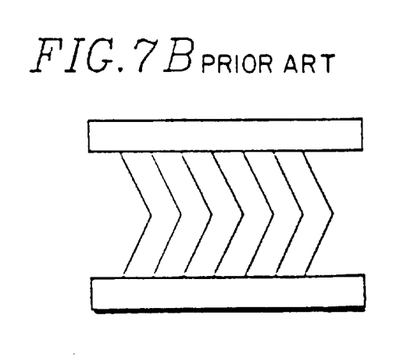

When ferroelectric liquid crystal display devices were initially proposed, a ferroelectric liquid crystal phase was considered to assume "a bookshelf layer structure" (FIG. 7A) in a direction perpendicular to substrates. However, further study has revealed that a ferroelectric liquid crystal phase usually has "a chevron layer structure" as shown in FIG. 7B.

Figure 1A:
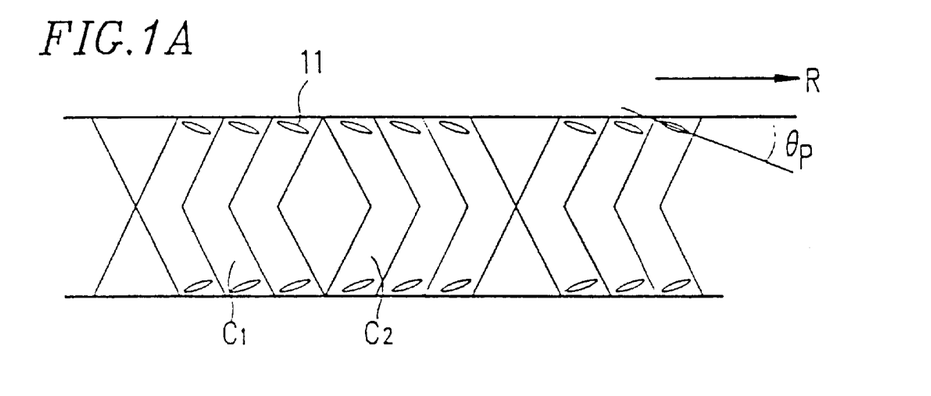
FIG. 1A schematically shows an orientation model of ferroelectric liquid crystal molecules in a ferroelectric liquid crystal layer.
Figure 1B:
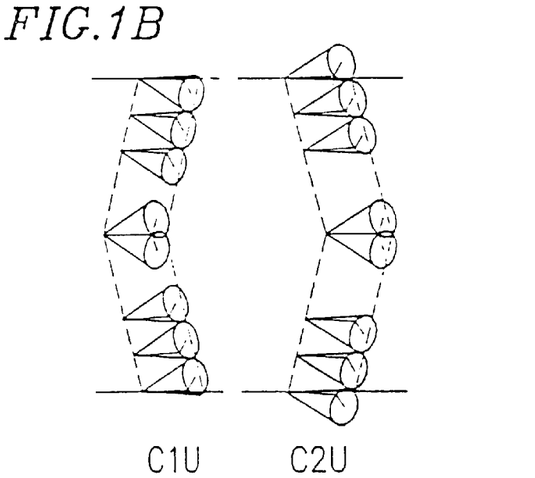
FIG. 1B shows molecular orientation models of C1U and C2U orientations of the ferroelectric liquid crystal layer in FIG. 1A.
Figure 1C:
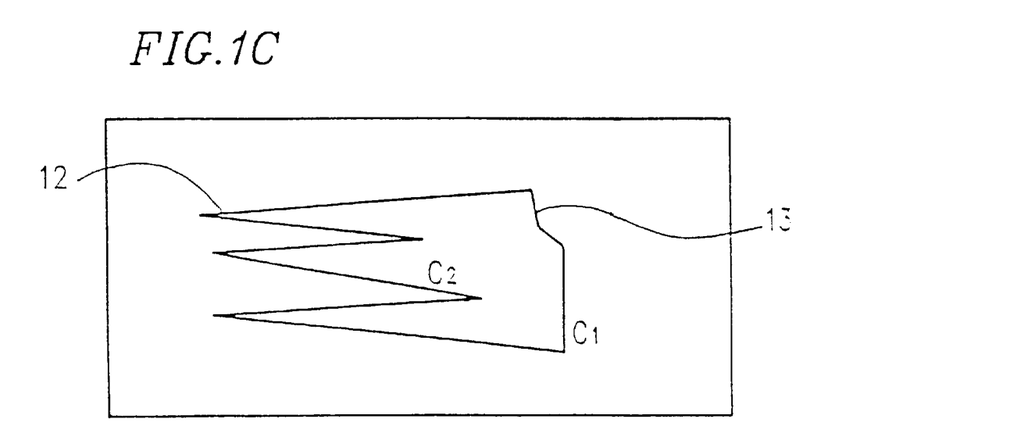
FIG. 1C shows an orientation model of ferroelectric liquid crystal molecules corresponding to the ferroelectric liquid crystal layer of FIG. 1A viewed along the normal of the liquid crystal layer.

The inventors of the present invention found that when a pretilt angle is provided onto upper and lower substrates in the identical direction in a ferroelectric liquid crystal display device, liquid crystal molecules assume four orientation states (C1U, C1T, C2U, C2T) depending upon the difference in molecular arrangement in the chevron layer structure, where "U" is for "uniform" and "T" is for "twist" in the orientation state designation. C1 and C2 are respectively defined based on the direction of a pretilt angle of the liquid crystal molecules and the bending direction of the chevron structure. C1 represents a state where the direction of the pretilt angle of the liquid crystal molecules is opposite to the bending direction of the chevron structure. C2 represents a state where the direction of the pretilt angle of the liquid crystal molecules is the same as the bending direction of the chevron structure. FIG. 1A shows a model of C1U (C1-uniform) orientation C1 and C2U (C2-uniform) orientation C2 of liquid crystal molecules 11 having a tilt angle $θ_p$, which are important in terms of practical use among these four orientation states. R in FIG. 1A represents a rubbing direction. In addition, FIG. 1B shows more detailed molecular orientations of C1U and C2U orientations. FIG. 1C shows an orientation model of ferroelectric liquid crystal molecules corresponding to the ferroelectric liquid crystal layer of FIG. 1A viewed along the normal of the liquid crystal layer. Reference numerals 12 and 13 represent a lightning defect and hairpin defect, respectively.

In the case where dielectric anisotropy of a ferroelectric liquid crystal material is positive or in the vicinity of 0, the liquid crystal molecules in C2U orientation are swayed to a great degree with a bias voltage. Thus, liquid crystal display devices with a high contrast cannot be obtained by using such a material. However, in the case where dielectric anisotropy of a ferroelectric liquid crystal material is negative (Δε<0), the liquid crystal material exhibits a specific $τ-V_{min}$ characteristic (herein, τ and V represent a response speed and an applied voltage, respectively). By taking advantage of this characteristic, an AC stabilize effect makes it possible to realize liquid crystal display devices with a high contrast even if the liquid crystal molecules are in C2U orientation. In ordinary ferroelectric liquid crystal materials, a response speed (τ) of a liquid crystal material linearly increases with the increase in a voltage (V). However, in the case where dielectric anisotropy of a ferroelectric liquid crystal material is negative and spontaneous polarization is not so large, the response speed (τ) exhibits a local minimum value ($τ-V_{min}$) with a certain voltage (V). The AC stabilized effect refers to this phenomenon. This phenomenon is caused by the increase in effect of dielectric anisotropy along with the increase in an rms of a voltage.

Figure 8:
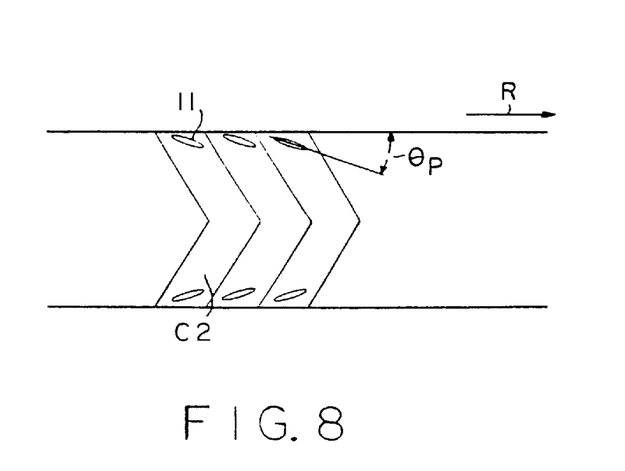
FIG. 8 schematically shows a C2U orientation model of ferroelectric liquid crystal molecules in a ferroelectric liquid crystal layer.

In general, C1 orientation is exhibited on a higher temperature side, and C2 orientation is stabilized with the decrease in temperature. C1U orientation is likely to change into C2 orientation or C1T orientation by the change in temperature or by the drive of a liquid crystal display device. Thus, C1 orientation is unstable with the change in temperature, so that C2U is more advantageous than C1 for ensuring a wide range of an operation temperature of a liquid crystal display device. Furthermore, a liquid crystal material in C2U (see FIG. 8) has a faster response speed and a larger memory property effect than those in C1U.

Thus, a $τ-V_{min}$ mode using C2U orientation of the ferroelectric liquid crystal material having negative dielectric anisotropy is preferable for liquid crystal display devices in terms of fast writing, a high contrast, and a wide range of an operation temperature.

In order to obtain a liquid crystal material in uniform C2U orientation, it is required to provide a pretilt angle to the substrates. The pretilt angle is typically in the range of about 0° to about 20°, and more preferably in the range of about 3° to about 8°.

Method for Controlling Orientation

In order to provide a pretilt angle to substrates, the following methods are used: a rubbing method in which a polymer material and an inorganic material are coated onto substrates forming a liquid crystal cell and these coated materials are subjected to rubbing with a cloth or the like; a homeotropic alignment method in which a compound having a low surface tension is coated onto substrates; oblique evaporation in which $SiO_2$ is obliquely evaporated onto substrates; and the use of a horizontal alignment film without conducting rubbing treatment.

According to the present invention, the rubbing method is preferred. In particular, it is preferred that substrates each provided with an alignment film, which is subjected to rubbing so as to obtain a medium pretilt angle, are attached to each other so that the respective rubbing directions are in parallel with each other. This is because the parallel rubbing easily realizes C2 orientation of a liquid crystal material. As an alignment film, organic polymer films are preferred. Examples of polymers forming alignment films include polyimide, and polyvinyl alcohol. For example, in the case where polyimide is used, such as AL1054, AL3356, AL5357 (produced by Japan Synthetic Rubber Co.), a medium pretilt angle can be realized.

Method For Producing Preferred Ferroelectric Liquid Crystal Display Device

A preferred method for producing a ferroelectric liquid crystal display device according to the present invention will be described.

First, substrates each having a transparent electrode and an alignment film are attached to each other with spacers interposed therebetween. The substrates are attached so that parallel rubbing can be obtained. Then, a mixture containing a ferroelectric liquid crystal material and a photopolymerizable monomer material is injected into the cell thus obtained. Thereafter, (1) the cell is heated until the mixture becomes isotropic liquid, and thereafter, the mixture is cooled to a temperature at which the liquid crystal material exhibits a chiral smectic C phase. Then, the photopolymerizable monomer material is photopolymerized in a temperature range in which the liquid crystal material exhibits a chiral smectic C phase, for example, by irradiating UV-rays to the cell, whereby a polymer is formed. Alternatively, (2) the cell is heated to a temperature at which the mixture becomes isotropic liquid, and the photopolymerizable monomer material is photopolymerized at this temperature. Then, a complex of the ferroelectric liquid crystal material and the generated polymer is cooled to a temperature at which the ferroelectric liquid crystal material in the complex exhibits a chiral smectic C phase.

In any of the steps (1) and (2), the ferroelectric liquid crystal display device of the present invention can be preferably produced. Preferably, the mixture is cooled to a temperature at which the appropriate orientation state of the liquid crystal molecules is formed, and under this condition, the monomer material is photopolymerized. In this case, the liquid crystal molecules are not likely to have their orientation state disturbed. Accordingly, a complex of the liquid crystal material having the appropriate orientation state and the polymer can be obtained.

The cell thickness is preferably in the range of about 1.0 $\mu$m to about 2.0 $\mu$m.

The above-mentioned photopolymerizable monomer material is photopolymerized usually in the range of about 1 to about 20 minutes.

Ferroelectric Liquid Crystal Material

Examples of commercially available ferroelectric liquid crystal material which can be used in the present invention include SCE8 (produced by Hechst Ltd.), ZLI-4237-000 (produced by Merck & Co., Inc.), ZLI-5014-000 (produced by Merck & Co., Inc.), CS-1014 (produced by Chisso Petrochemical Corp.) and the like. A mixture of these materials can be used as well. It is preferable to use a ferroelectric liquid crystal material having a negative dielectric anisotropy so as to utilize the $\tau - V_{min}$ mode in the C2U orientation state. The characteristics of the complex according to the invention depends on the combination of the ferroelectric liquid crystal material and the polymer (polymerizable monomer) included in the complex. Therefore, in accordance with the desired characteristics of the complex, the ferroelectric liquid crystal material having a suitable dielectric constant and amount of spontaneous polarization charge can be selected.

Photopolymerizable Monomer

Examples of the photopolymerizable monomer material used in the present invention include acrylic esters having a long-chain alkyl group or an aromatic group with 3 or more carbon atoms. Examples of the acrylic esters include isobutyl acrylate, stearyl acrylate, lauryl acrylate, isoamyl acrylate, n-butyl acrylate, tridecyl acrylate, 2-ethylhexyl acrylate, cyclohexyl acrylate, benzyl acrylate, 2-phenoxyethyl acrylate, isobutyl methacrylate, stearyl methacrylate, lauryl methacrylate, isoamyl methacrylate, n-butyl methacrylate, tridecyl methacrylate, 2-ethylhexyl methacrylate, cyclohexyl methacrylate, benzyl methacrylate, 2-phenoxyethyl methacrylate, and halides of these monomers (in particular, chlorinated monomers or fluorinated monomers). Examples of the halides include 2,2,3,4,4,4-hexafluorobutyl methacrylate, 2,2,3,4,4,4-hexachlorobutyl methacrylate, 2,2,3,3-tetrafluoropropyl methacrylate, 2,2,3,3-tetrachloropropyl methacrylate, perfluorooctylethyl methacrylate, perchlorooctylethyl methacrylate, perfluorooctylethyl acrylate, and perchlorooctylethyl acrylate. Theses monomers can be used alone or in combination.

The photopolymerizable monomer material is contained in the mixture of the ferroelectric liquid crystal material and the photopolymerizable monomer material preferably in an amount of about 1 to about 10% by weight, and more preferably in an amount of about 2 to about 5% by weight. When the weight of the photopolymerizable monomer material is more than about 10% by weight, the force regulating the movement of the liquid crystal molecules becomes too strong, so that the response speed of the liquid crystal display device becomes low. Furthermore, the alignment state of the liquid crystal material is worsened. When the weight of the photopolymerizable monomer material is less than about 1% by weight, effect of shock stability cannot be obtained.

In order to further enhance the physical strength of the polymer, a polyfunctional monomer with 2 or more functional groups can be copolymerized. Examples of the polyfunctional monomer include bisphenol A dimethacrylate, bisphenol A diacrylate, 1,4-butanediol dimethacrylate, 1,6-hexanediol dimethacrylate, trimethylol propane trimethacrylate, trimethylol propane triacrylate, and tetramethylolmethane tetraacrylate.

If required, a chlorinated or fluorinated polymer or oligomer can be mixed with the above-mentioned monomer. In addition, monomers having a structure similar to that of the ferroelectric liquid crystal material can be copolymerized.

Photopolymerization Initiator

The photopolymerizable monomer material of the present invention can contain a photopolymerization initiator, if required. Examples of the photopolymerization initiator include Irgacure 651, Irgacure 184 (produced by Ciba-Geigy Corporation), and Darocure 1137 (produced by Merck & Co., Inc.). It is preferred that the photopolymerization initiator be added, if required, in an amount of about 0 to about 1% by weight based on the total weight of the mixture of the liquid crystal material and the photopolymerizable resin material composition. When the added amount of the photopolymerization initiator is more than about 1% by weight, the polymerization rate is too fast to control side reactions.

EXAMPLE 1

Reffering again FIG. 6, ITO films 2a and 2b were respectively formed on substrates 1a and 1b made of glass or the like, and were patterned to a stripe shape by photolithography or the like. $SiO_2$ insulating films 3a and 3b were respectively formed on the ITO films 2a and 2b. Then, polyimide alignment films 4a and 4b (pretilt angle: 5°) were coated onto the insulating films 3a and 3b and subjected to rubbing.

The substrates 1a and 1b were attached to each other so that the respective rubbing directions were parallel with each other. The resultant cell thickness was 1.5 μm. Mixture A containing 99.0% by weight of ferroelectric liquid crystal (FLC1) exhibiting negative dielectric anisotropy shown in Table 1 and 1.0% by weight of a photopolymerizable monomer material was injected between the substrates 1a and 1b. The liquid crystal display device thus obtained was heated to 100° C. so as to put mixture A in an isotropic liquid state, and then was irradiated with UV-rays at 14 mW/cm². The device was cooled down to room temperature and observed with a polarizing microscope, indicating that the liquid crystal material was in satisfactory C2 orientation.

Figure 2:
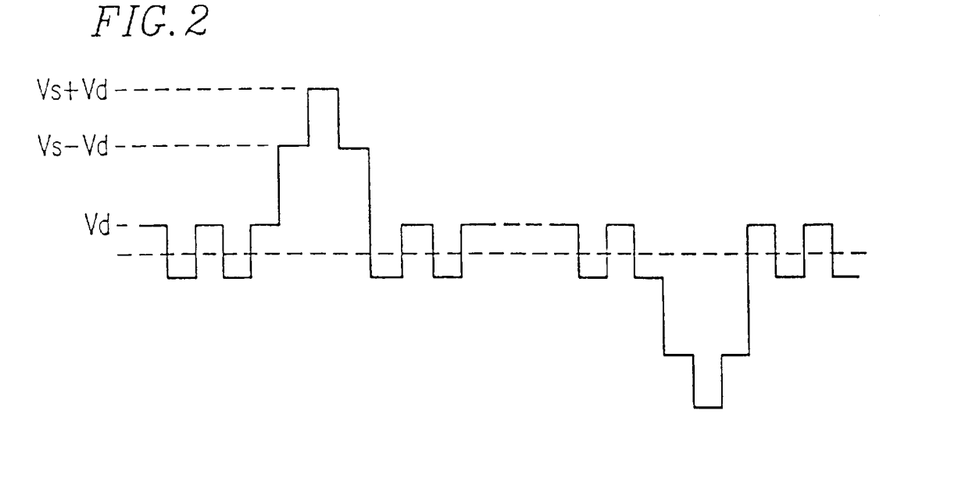
FIG. 2 illustrates a drive waveform used in the examples according to the present invention.
Figure 3:
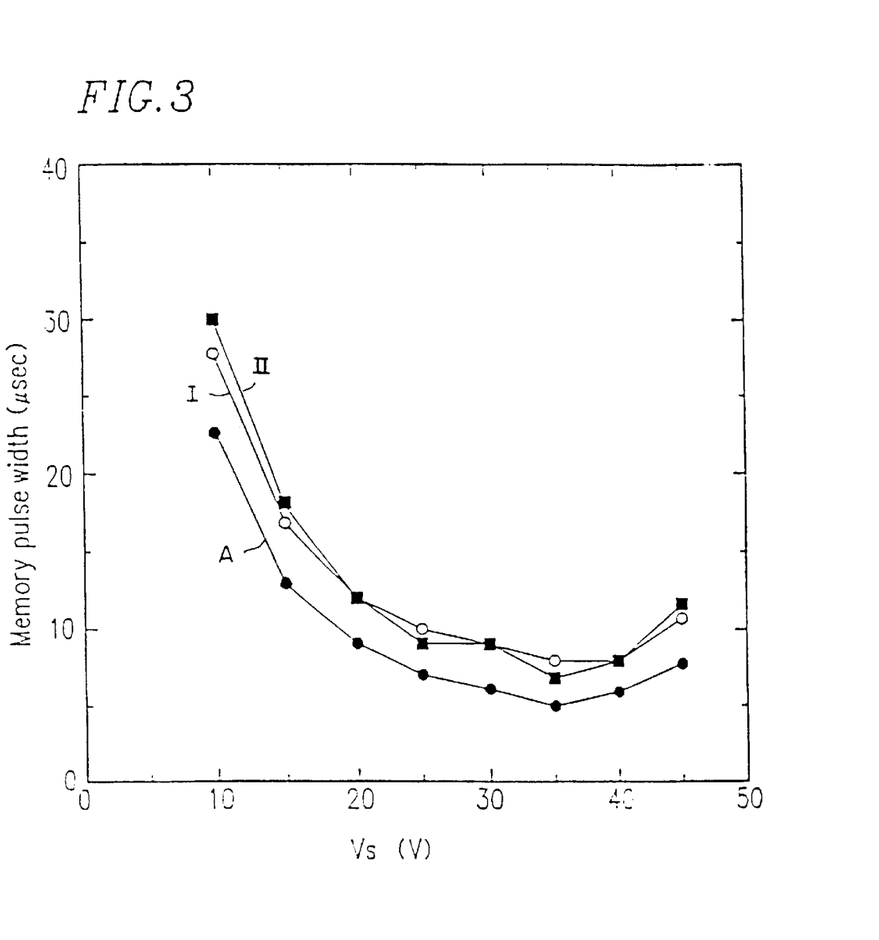
FIG. 3 is a graph showing voltage-memory pulse width curves of liquid crystal display devices of Examples 1 and 2 and Comparative Example 1 according to the present invention.

A driving experiment was conducted by applying the drive waveform shown in FIG. 2 to the ferroelectric liquid crystal. A minimum pulse width which was bistably switched was plotted as curve 1 (0) in FIG. 3 by applying a pulse width different from a pulse width τ of switching voltage (Vs), under the condition that driving voltage (Vd) is set at 5 volts. FIG. 3 shows that the display device of Example 1 provided a graph of the memory pulse width versus switching voltage pulse magnitude for the ferroelectric liquid crystal material wherein the memory pulse width decreases initially with increasing switching voltage magnitude, goes through a minimum value, and then increases. Thus, the display device of Example 1 exhibited a local minimum value in the voltage-memory pulse width curve and satisfactory bistable switching.

Furthermore, the display device was placed on a metal plate and a metallic cylinder with a diameter of 1 cm was lowered to the display device at 0.5 mm/min. by using AGA-100A manufactured by Shimadzu Corporation. Thus, the display device of Example 1 was evaluated for shock stability. The result was that the display device exhibited satisfactory shock stability of about 0.6 to about 1.3 kgf/cm².

switched with respect to Vs was plotted as curve II in FIG. 3 (■). FIG. 3 shows that the liquid crystal display device of Example 2 provided a graph of the memory pulse width versus switching voltage pulse magnitude for the ferroelectric liquid crystal material wherein the memory pulse width decreases initially with increasing switching voltage magnitude, goes through a minimum value, and then increases. Thus, the display device of Example 2 exhibited a minimum value in the voltage-memory pulse width curve and satisfactory bistable switching.

Furthermore, the display device of Example 2 exhibited satisfactory shock stability of about 1.9 to about 2.5 kgf/cm²

Comparative Example 1

A ferroelectric liquid crystal display device was produced in the same way as in Example 1, except that a photopolymerizable monomer was not used and UV-ray irradiation was not conducted. A minimum pulse width which was bistably switched with respect to Vs was plotted as curve A in FIGS. 3 and 4 (●). The display device exhibited a local minimum value in the voltage-memory pulse width curve, and the liquid crystal molecules in the display device were in C2 orientation at room temperature; however, the display device had an unsatisfactory shock stability of 0.6 kgf/cm².

EXAMPLE 3

A ferroelectric liquid crystal display device was produced and evaluated in the same way as in Example 1 with the following alterations: Mixture A was put in an isotropic liquid state and was cooled down to room temperature so as to put the liquid crystal material in C2 orientation, the liquid crystal molecules were arranged in an up and down direction, and Mixture A was irradiated with UV-rays.

Figure 4:
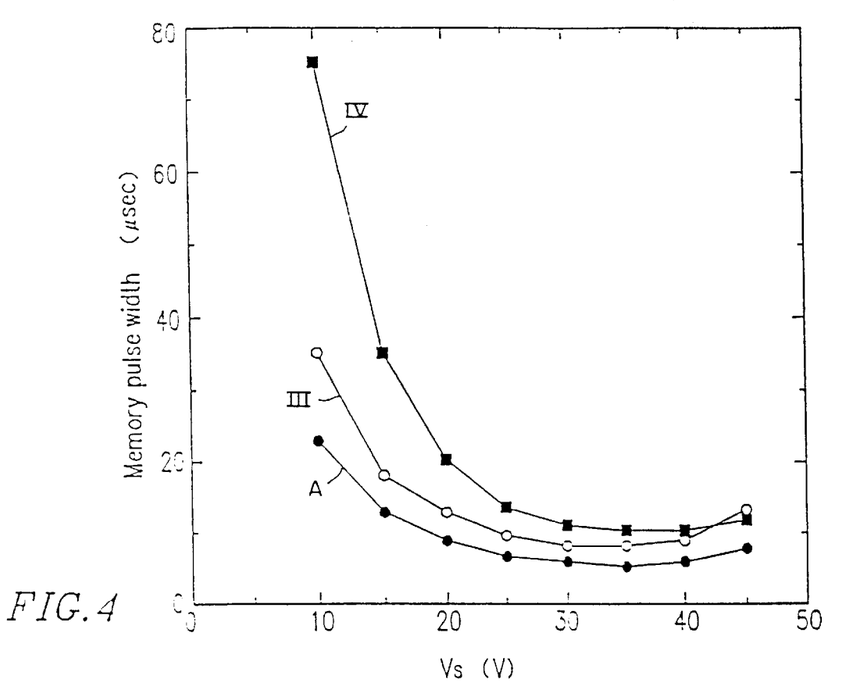
FIG. 4 is graph showing voltage-memory pulse width curves of liquid crystal display devices of Examples 3 and 4 and Comparative Example 1 according to the present invention.

A minimum pulse width which was bistably switched with respect to Vs was plotted as curve III in FIG. 4 (O). FIG. 4 shows that the display device of Example 3 provided a graph of the memory pulse width versus switching voltage pulse magnitude for the ferroelectric liquid crystal material wherein the memory pulse width decreases initially with increasing switching voltage magnitude, goes through a minimum value, and then increases. Thus, the display device of Example 3 exhibited a local minimum value in a voltage-memory pulse width curve and satisfactory bistable switching.

TABLE 1

FLCl: $CH_2=CH-COO-(CH_2)_{12}-O-$⟨benzene⟩-⟨benzene with F, F⟩

| | | |
|---|---|---|
| Mixture A | 99.0 wt % | 1.0 wt % |
| Mixture B | 97.0 wt % | 3.0 wt % |

Phase Transition Temperature of FLCl: $S_c 54 S_A 74 N 82 I$

EXAMPLE 2

A ferroelectric liquid crystal display device was produced and evaluated in the same way as in Example 1, except that Mixture B containing 97.0% by weight of ferroelectric liquid crystal (FLC1) and 3.0% by weight of photopolymerizable monomer material was used in place of Mixture A of Example 1. A minimum pulse width which was bistably Furthermore, the display device of Example 3 exhibited satisfactory shock stability of about 1.3 to about 1.9 kgf/cm².

EXAMPLE 4

A ferroelectric liquid crystal display device was produced and evaluated in the same way as in Example 2 with the following alterations: Mixture B was put in an isotropic liquid state and was cooled down to room temperature so as to put the liquid crystal material in C2 orientation, the liquid crystal molecules were arranged in an up and down direction, and Mixture B was irradiated with UV-rays.

A minimum pulse width which was bistably switched with respect to Vs was plotted as curve IV in FIG. 4 (■). FIG. 4 shows that the display device of Example 4 provided a graph of the memory pulse width versus switching voltage pulse magnitude for the ferroelectric liquid crystal material wherein the memory pulse width decreases initially with increasing switching voltage magnitude, goes through a minimum value, and then increases. Thus, the display device of Example 4 exhibited a local minimum value in a voltage-memory pulse width curve and satisfactory bistable switching.

Furthermore, the display device of Example 4 exhibited satisfactory shock stability of about 1.9 to about 2.0 kgf/cm$^2$.

According to the present invention, a ferroelectric liquid crystal display device is provided, which has satisfactory shock stability and exhibits a local minimum value in a voltage-memory pulse width curve and satisfactory bistable switching.

Furthermore, the ferroelectric liquid crystal is put in a particular orientation state in a mixture of a ferroelectric liquid crystal material and a photopolymerizable monomer material and the monomer material is photopolymerized, whereby satisfactory orientation of the ferroelectric liquid crystal can be obtained.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for producing a ferroelectric liquid crystal display device, comprising the steps of:

attaching substrates to each other, each substrate having an electrode film and an alignment film;

providing a mixture of a ferroelectric liquid crystal material and a photopolymerizable monomer material between the substrates;

heating the mixture to a temperature at which the mixture becomes isotropic liquid, followed by cooling the mixture to a temperature at which the ferroelectric liquid crystal material in the mixture exhibits a chiral smectic C phase; and photopolymerizing the photopolymerizable monomer material in the mixture in a temperature range in which the ferroelectric liquid crystal material in the mixture exhibits a chiral smectic C phase so as to form a polymer.

2. A method for producing a ferroelectric liquid crystal display device according to claim 1, wherein directions of pretilt angles of molecules of the ferroelectric liquid crystal material located at interfaces between the substrates and the ferroelectric liquid crystal material are substantially identical, the ferroelectric liquid crystal material has a chevron layer structure, and a bending direction of the chevron layer structure is substantially identical to the directions of pretilt angles of the molecules at the interfaces when the ferroelectric liquid crystal material in the mixture is at a temperature at which it exhibits a chiral smectic C phase.

3. A method for producing a ferroelectric liquid crystal display device according to claim 2, wherein the ferroelectric liquid crystal material exhibits negative dielectric anisotropy and a local minimum value in a voltage-memory pulse width curve.

4. A method for producing a ferroelectric liquid crystal display device according to claim 1, wherein the alignment film is an organic polymer film and provided with a pretilt angle by rubbing.

5. A method for producing a ferroelectric liquid crystal display device according to claim 1, wherein the ferroelectric liquid crystal material exhibits negative dielectric anisotropy and a local minimum value in a voltage-memory pulse width curve.

6. A method for producing a ferroelectric liquid crystal display device according to claim 1, wherein a content of photopolymerizable monomer material is about 1% to about 10% by weight of the total weight of the mixture.

* * * * *

UNITED STATES PATENT AND TRADEMARK OFFICE
CERTIFICATE OF CORRECTION

PATENT NO.   : 6,038,009
DATED        : March 14, 2000
INVENTOR(S)  : Aya Miyazaki et al.

It is certified that error appears in the above-identified patent and that said Letters Patent is hereby corrected as shown below:

<u>Title page,</u>
Please add the following: -- [30]  Foreign Application Priority Data: Jun. 22, 1995 [JP]  Japan …….. 7-156566 --

Signed and Sealed this

Tenth Day of December, 2002

JAMES E. ROGAN
*Director of the United States Patent and Trademark Office*